Patented Mar. 30, 1954

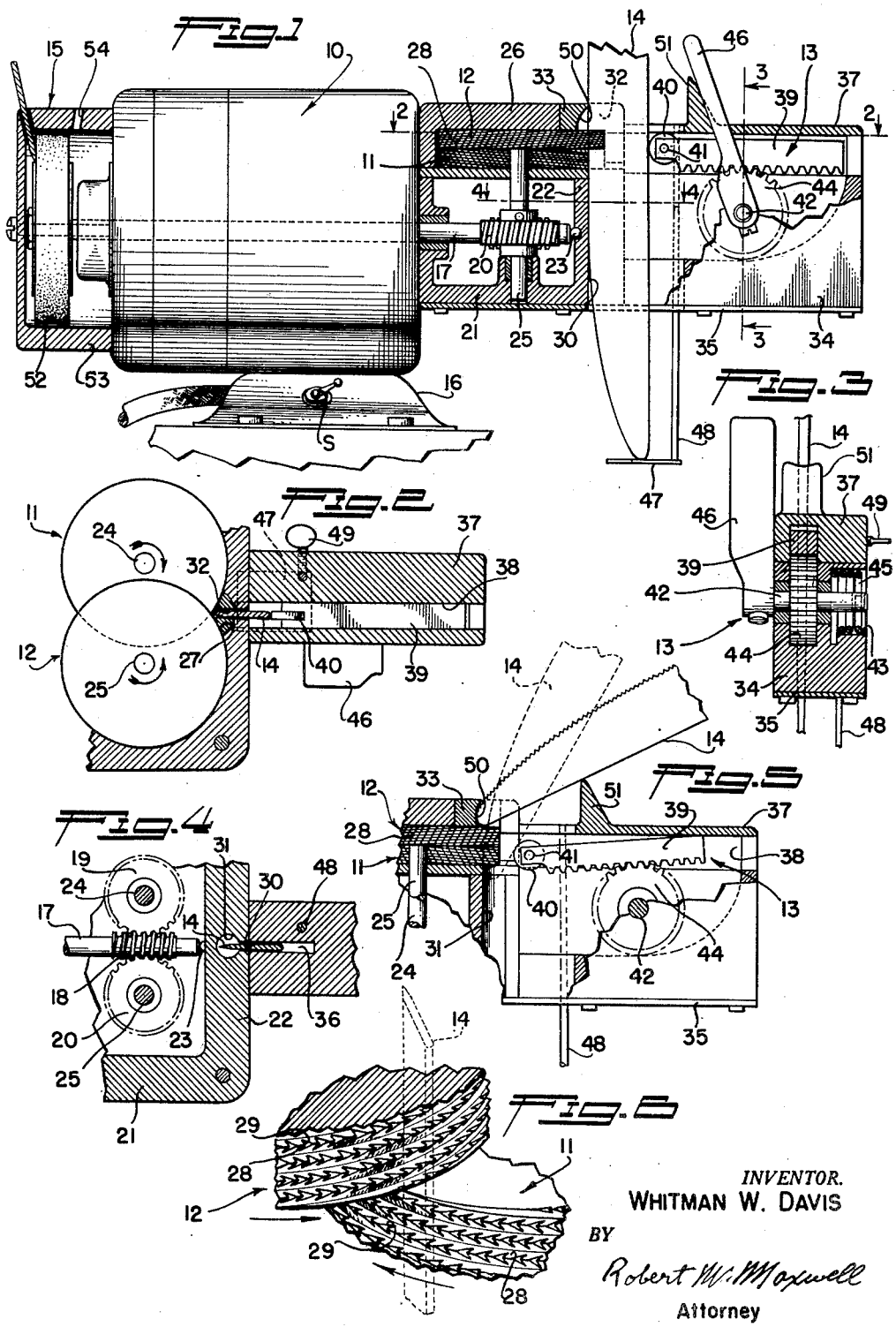

2,673,477

UNITED STATES PATENT OFFICE 2,673,477

SERRATING MACHINE

Whitman W. Davis, Burbank, Calif.

Application December 6, 1949, Serial No. 131,357

8 Claims. (Cl. 76—89.1)

This invention relates to serrating devices and relates more particularly to machines for serrating the cutting edges of various tools and implements such as knives, bread-slicing blades, bun-cutting disks, and the like.

It has been known for some time that knives of various kinds, such as steak knives, butcher knives and bread knives cut more effectively and with less effort if the cutting edge is provided with small serrations, and some knives are manufactured and sold with such serrations. However, so far as I am aware, there is no really practical device available to restaurants, hotels, butcher shops, etc. for cutting serrations in new knives and in knives that have been resharpened.

It is therefore a general object of this invention to provide a practical, inexpensive and effective device or machine for serrating the cutting edges of various tools such as knives, blades, cutting disks and the like. The machine of the invention is operable to dependably and rapidly cut serrations of selected depth in the cutting edges of tools and implements.

It is another object of the invention to provide a serrating machine which operates to cut regular uniformly spaced serrations in both sides of cutting edges of straight blades, straight blades having curved tips such as found on steak knives, bread knives, butcher knives, etc., cutting bands or ribbons such as employed in bread-slicing machines, disks of the type sometimes employed to cut buns and other bakery products, and, in fact, in cutting edges of practically any configuration. The machine operates in a single operation to automatically advance the cutting tool or knife in such a way that the serrations are cut in both sides of the edge thereof irrespective of the contour of the blade.

Another object of the invention is to provide a device of the character referred to characterized by two or more cutting rolls or disks so formed and related as to cut regular uniformly spaced serrations in the edge of a tool or implement while automatically advancing the implement for the cutting of the successive serrations. The disks or rolls are provided with helical thread-like ridges interrupted by spaced angular notches or cuts to present multiplicities of cutting teeth, the helical ridges of the adjacent rolls being of opposite hand, i. e., the ridges of one roll are spiralled in the right-hand direction while the ridges of the other roll are pitched in the left-hand direction, the rolls being simultaneously rotated in opposite directions and being so related that a cutting blade urged against their peripheries is advanced longitudinally by the helical ridges while the teeth of the ridges cut serrations in each side of the edge of the blade. The unique formation and relationship of the toothed disks or rolls provide for the simultaneous cutting of the serrations from the opposite sides of the blade edge and advancement of the blade or knife past the rolls.

A further object of the invention is to provide a serrating device of the class referred to incorporating a simple, effective means for urging the knife blade, or the like, laterally against the serrating rolls, which means assures the cutting of serrations of selected depth in curved or contoured cutting edges as well as in straight edges.

A further object of the invention is to provide a serrating device requiring a minimum of attention on the part of the operator and capable of being safely and successfully employed by unskilled labor. For example, in serrating the edge of a steak knife the operator moves a lever to temporarily retract the lateral feed means, inserts the knife blade in the machine to bring its end or point against a previously adjusted stop and to bring its edge against the toothed serrating rolls, and then releases the lever. The rolls will then cut the serrations and advance the blade axially so as to form the serrations along the edge of the knife and when the blade has been fed past the rolls in this manner, it automatically comes to rest in a position at the top of the machine out of contact with the rolls and where it is free and accessible for removal by the operator.

A still further object of the invention is to provide a serrating machine of the class mentioned incorporating means for grinding or sharpening the cutting edges of knives and the like preparatory to being serrated or otherwise.

Other objectives and features of the invention will become apparent from the following detailed description of a typical preferred form of the invention, throughout which description reference will be made to the accompanying drawings, in which:

Figure 1 is a side elevation of the machine with the speed reduction drive, the grinding means, serrating means and a portion of the lateral feed mechanism appearing in vertical cross section;

Figure 2 is a fragmentary horizontal sectional view taken substantially as indicated by line 2—2 on Figure 1 with the serrating rolls appearing in plan view;

Figure 3 is a vertical detailed sectional view taken as indicated by line 3—3 on Figure 1;

Figure 4 is a fragmentary horizontal sectional view taken as indicated by line 4—4 on Figure 1;

Figure 5 is a fragmentary vertical sectional view of a portion of the machine illustrating the positions assumed by a knife at the termination of the serrating operation; and Figure 6 is an enlarged fragmentary perspective view of the serrating rolls, illustrating their cutting teeth.

The invention is capable of embodiment in machines for cutting serrations in the edges of various tools and objects. Accordingly, while I herein describe one form of the invention suitable for serrating the cutting edges of knives, disks, bands, etc., it is to be understood that this is merely a typical illustrative embodiment and application and it is not to be construed as limiting or restricting the invention. The machine as illustrated and described is power-driven, embodying an electric motor, and it is to be understood that I contemplate the actuation of the device by other power means or by manual operation.

The machine as illustrated in the drawings may be said to comprise generally a power means or motor 10, toothed disks or rolls 11 and 12 driven by the motor 10, means for feeding or urging a blade 14 against the rolls 11 and 12, grinding means 15 driven by the power means 10 for sharpening the blade 14, and other features the details of which will be hereinafter described.

The embodiment of the invention illustrated is of the type that may be readily moved from place to place as the requirements of use dictate, and the motor 10 is preferably of the class of motor-driven appliances that may be "plugged into" and energized by the electrical service available in hotels, restaurants, residences, etc. The motor 10 may be controlled by an appropriate switch S in its circuit. I have shown the motor 10 supported on a suitable base 16 to have its shaft 17 extend horizontally. The shaft 17 projects from each end of the motor 10, one end portion of the shaft serving to drive the disks or rolls 11 and 12 and the other end of the shaft serving to drive the sharpening means 15.

The drive for the serrating rolls 11 and 12 includes a speed reduction mechanism operable to rotate the rolls in opposite directions at the same angular speed. In the particular structure illustrated this drive mechanism includes a worm 18 on the motor shaft 17 driving spaced worm wheels 19 and 20. The drive is housed in a casing 21 mounted at an end of the motor 10 and a vertical end wall 22 of the casing has a socket containing a thrust bearing 23 for the worm. The bearing 23 may be in the form of a steel ball engaged by the end of the worm 18 as illustrated in Figures 1 and 4. The above-mentioned worm wheels 19 and 20 are fixed on vertical shafts 24 and 25, respectively, suitably journalled in the upper and lower walls of the casing 21. It will be apparent that the ratio between the worm 18 and wheels 19 and 20 may be selected to provide for the required speed reduction. The wheels 19 and 20 mesh with the worm 18 at diametrically opposite regions so that the shafts 24 and 25 are driven in opposite directions. The wheels 19 and 20 are of the same diameter so that the shafts 24 and 25 are rotated at the same speed. The shafts 24 and 25 extend upwardly from the casing 21 to carry their respective disks or rolls 11 and 12.

The serration-cutting rolls 11 and 12 and the relationship between the rolls are features of the invention. The disks or rolls 11 and 12 have cylindrical peripheries and are of the same diameter and thickness. As illustrated in the drawings, the rolls 11 and 12 are located above the housing 21 and are keyed, splined or otherwise removably secured to the protruding upper ends of the shafts 24 and 25. A cap or cover plate 26 is provided at the upper side of the casing 21 and its under side is recessed or relieved to contain the two rolls 11 and 12. The rolls 11 and 12 occupy adjacent or contiguous horizontal planes, the roll 11 having its under side at the top wall of the case 21 and the roll 12 having its under surface at the uper surface of the roll 11. This relationship is shown in Figure 1. In practice the under surface of the roll 12 may ride upon or be immediately adjacent the upper surface of the roll 11. The rolls 11 and 12 are partially superimposed, i. e., the upper roll 12 overlaps the roll 11, as shown in Figure 2. The extent of this overlapping is important and is such as to cause the peripheries of the two rolls to outline or define a reentry or notch 27 when the set of rolls is viewed from above as in Figure 2. The formation of the rolls 11 and 12, the diameters of the rolls and the relationship of their axes of rotation are such that the notch 27 is sufficiently deep to cause the toothed peripheries of the rolls to cut the serrations in both sides of the cutting edge of the blade 14 and yet is not excessively deep to cause binding of the blade between the rolls. The rolls 11 and 12 are rotated in opposite directions by the speed reduction gearing described above so that their peripheries turn toward one another at the notch 27, the rolls being rotated in the directions indicated by the arrows in Figure 2.

The peripheries or active surfaces of the rolls 11 and 12 are provided with toothed helical ridges 28. In practice the ridges 28 may be formed by cutting V threads on the rolls and it is preferred to form multiple threads on each roll. For example, there may be from six to ten threads on each roll, each thread having a "start" at one face of the roll and an end at the other face of the roll. The threads or helical ridges 28 of the two rolls are identical except that the ridges are of opposite hand, i. e., the ridges on the roll 12 are pitched in the right-hand direction and the ridges of the roll 11 are pitched in the left-hand direction as illustrated in Figure 1. The helical ridges 28 are interrupted by equally-spaced substantially V-shaped cuts 29 best illustrated in Figure 6. The cuts 29, which extend at a suitable angle, say at an angle of sixty degrees from the horizontal, divide the helical ridges 28 into multiplicities of cutting teeth as shown in Figure 6. It is these teeth, or at least the sharp edges provided by the cuts 29, which cut or form the serrations in the edge of the blade 14 and it is the helical pitch of the ridges 28 which feeds or advances the blade as the serrations are formed. The serration-cutting disks or rolls 11 and 12 are of steel and are appropriately hardened, heat treated or tempered to be long wearing.

The forward face of the casing wall 22 has a vertical slot 30 for receiving the blade 14 and a vertical bore or opening 31 joins the slot to receive and carry away the cuttings resulting from the serrating operations. The above-described cover 26 also has a vertical cut or slot 32 for guiding the blade 14 and where the cover is formed of relatively soft metal, it may have a hard metal insert 33 provided with the slot 32 just mentioned.

The means 13 serves to feed or urge the blade 14 against the rolls 11 and 12 at the notch 27 to maintain a proper or selected pressure contact of the sharpened blade edge with the toothed rolls. This means 13 includes a horizontally extending block-like body 34 carried by a plate 35 secured to the under side of the casing 21. The inner end of the body 34 has a vertical groove or slot 36 registering with the slots 30 and 32 to receive and guide the blade 14. A block 37 is secured to the upper side of the body 34 and has a way or channel 38 which slidably carries a toothed rack 39. The channel 38 receives the rack 39 with considerable vertical clearance to allow tilting of the rack as will be later described. A roller 40 is rotatably carried by a horizontal pin 41 on the forward end of the rack 39 and is adapted to engage or bear against the rear edge of the blade 14.

The mechanism for actuating the rack 39 includes a horizontal shaft 42 rotatably supported in a transverse opening 43 in the body 34 and a pinion 44 is fixed on the shaft to mesh with the teeth of the rack. As illustrated in the drawings, the teeth of the rack 39 are on its under side and the pinion 44 is below the rack. A coiled torsion spring 45 is housed in the opening 43 to exert a turning force on the pinion 44. One end of the spring 45 is anchored in the opening 43 while the other end is secured to the shaft 42 so that the spring tends to rotate the pinion 44 in a direction to press the roller 40 against the blade 14 and thus hold the cutting edge of the blade against the toothed peripheries of the rolls 11 and 12. The force exerted by the spring 45 is a factor in determining the depth of the serrations cut in the sharpened edge of the blade 14 and the spring may be of practically any selected strength. Means is provided whereby the rack 39 and roller 40 may be retracted to permit the insertion of the knife or blade 14 into the machine. This means comprises a manual lever 46 secured to an end of the shaft 42 and projecting upwardly beyond the plate 37 for convenient engagement by the operator. It will be seen that by swinging the lever 46 rearwardly the rack 39 is moved to the rear where it is clear of the knife-receiving slot 36. By moving the lever 46 forwardly the blade 14 may be manually urged or fed against the toothed rolls 11 and 12.

An adjustable foot or stop 47 is provided to assist in positioning the knife or blade 14 for the initiation of the serrating operation. The stop 47 is engageable by the tip or end of the blade 14, when the knife is introduced into the machine, to limit the downward insertion of the knife and thus determine the portion of the knife edge that will receive the serrations. A rod 48 slidably passes through a vertical opening in the body 34 and plate 37 and extends downwardly from the body to carry the stop 47. A set screw 49 is threaded into the body 34 and is engageable with the rod 48 to lock the stop 47 in any selected position. When the extent of the serrating operation is to be controlled manually or when long blades or the like are to be serrated, the set screw 49 is loosened and the rod 48 is either turned to swing the stop 47 out of alignment with the knife or the rod is removed to detach the stop from the machine.

In accordance with the invention, the means 13 is such that the blade or knife 14 will automatically stop in a raised ejected position, such as illustrated by the full lines in Figure 5, at the completion of the serrating operation and will remain in that position until removed by the operator. The above-described roller 40 engages the back edge of the knife blade 14 at a point slightly below the plane of contact of the opposing faces of the rolls 11 and 12. As the curved tip portion of the blade 14 feeds upwardly to the serrating rolls 11 and 12, the weight of the upper portion of the knife and of the knife handle causes the blade to tip rearwardly, as indicated by the broken lines in Figure 5, and the roller 40 is pressed downwardly and rearwardly, the rack 39 being free to tilt or rock to a limited extent on the pinion 44 to permit this movement of the roller. The tilting of the rack 39 and the downward motion of the roller 40 brings the spring-urged roller to a position where it is effective in pressing the curved tip part of the knife edge against the serrating rolls 11 and 12. These considerations result in the cutting of deeper serrations in the point portion of the blade, where the knife most frequently contacts the plate, providing for a longer service life for the knife. The serrating operation continues until the top of the blade 14 leaves the upper roll 12 whereupon the blade tip moves into an undercut recess 50 in the abovementioned insert 33. At this time the back edge of the blade 14 comes to rest against a raised support 51 on the plate or block 37. This position of the blade 14 is shown in full lines in Figure 5. It will be seen that the blade is automatically fed through the machine to a position where it is finally out of contact with the serrating rolls 11 and 12 and where it is conveniently accessible for removal by the operator.

The sharpening means 15 includes a grinding or sharpening wheel 52 fixed on the motor shaft 17. The wheel 52 is enclosed in a case 53 which may be secured to the end of the motor 10. Convergent slots 54 are provided in the top wall of the case 53 to receive the knives or other cutting implements. The cuts or slots 54 are positioned and inclined so that a blade inserted through one of them may have its cutting edge brought into contact with a side surface of the wheel 52, the other slot being located so that a blade inserted in it may be brought against the opposite side surface of the wheel. It will be seen how the knife and other cutting implements may be conveniently sharpened at the wheel 52 prior to cutting the serrations in the sharpened edges.

The device or machine as illustrated in the drawings is adapted to cut serrations in knives or various kinds, bands, ribbons, etc., of limited width. If it is desired to serrate the cutting edges of disks or bands of greater width, the body 34, with the parts associated therewith, may be detached so that the disks or wider bands and knives may be moved into the notch 27 to contact with toothed peripheries of the serrating rolls 11 and 12. In such operations the cutting implement may be urged against the cutting rolls 11 and 12 manually or by any appropriate means.

It is believed that the operation of the serrating machine of this invention will be readily understood from the foregoing detailed description. To initiate the operation of the machine the motor 10 is started by closing the switch S. The lever 46 is then swung rearwardly and the blade 14 is introduced downwardly through the slots 30, 32 and 36 any selected distance. As above described, the stop 47 may be employed to limit the introduction of the knife and thus determine the portion of the knife that is to be serrated. The handle 46 is then released so that the spring-urged roller 40 presses the blade 14 against the counter-rotating disks 11 and 12 at the notch 27. The formation of the toothed helical threads or ridges 29 and the overlapping relationship of the counter-rotating rolls 11 and 12 are such that the sharpened edge of the blade 14 is effectively serrated and at the same time advanced upwardly. In actual practice I have found that knives of various kinds and materials are readily serrated in the machine without binding or jamming and that regular uniformly-spaced and complete serrations are cut both in new knives that have not been previously serrated and in knives that have been previously serrated. The spring-urged roller 40 presses the blade 14 against the rolls 11 and 12 with sufficient force to cut serrations of a selected depth, it being understood that it may be necessary to pass or run the knife through the machine two or more times in certain instances to obtain serrations of the desired depth. The slots 30, 32 and 36 guide the knife blade 14 vertically as it moves upwardly although the toothed peripheries of the counter-rotating disks 11 and 12 turning toward one another at the notch 27 tend to maintain the blade in a correct vertical position as the serrating progresses. As previously described, the rack 39 tilts downwardly at its inner end to lower the roller 40 as the curved tip portion of the knife edge moves into engagement with the rolls 11 and 12 and the rack 39 continues to feed inwardly and press the tip part of the knife edge against the rolls. In this way deeper serrations are formed throughout the curved tip portion of the knife edge and when the knife leaves the upper roller 12 its top automatically moves into the undercut notch 50 while its rear edge rests against the support 51, all as previously described. The slot or cut 32 in the cover 26 comes into operation to guide and stabilize the knife blade 14 as its cutting edge moves across the upper roll 12 after leaving the lower roll 11. The metal cuttings produced during the serrating operation are free to fall through the opening 31, and the recess or reentry in the under side of the cover 26 may be shaped and formed in such a way that the cuttings do not jam the rolls.

Having described only a typical preferred form of my invention, I do not wish to be limited or restricted to the specific details set forth, but wish to reserve to myself any features or modifications that fall within the scope of the following claims.

I claim:

1. A device for cutting serrations in both sides of the edge of a cutting tool comprising a pair of rolls arranged in contiguous parallel planes, shafts supporting the rolls for rotation about spaced parallel axes normal to said planes and with the periphery of each roll adjacent the axis of rotation of the other so that the peripheries of the rolls define a broad-mouthed notch, multiple right-hand threads on the periphery of one roll, multiple left-hand threads on the periphery of the other roll, the threads being interrupted by spaced cuts to constitute helical rows of teeth, means for rotating said shafts and their respective rolls in opposite directions to cause the peripheries of the rolls to turn toward one another at said notch, guide surfaces for directing the tool through said notch in a direction substantially parallel with the axes of rotation of the rolls, and means for urging the guided tool against the toothed peripheries of the rolls to be serrated thereby, the helical rows of teeth advancing the tool in said direction, the last-named means including a rack having a part for pushing against the tool, a pinion meshing with the rack, and a torsion spring associated with the pinion and exerting a turning force thereon.

2. A device for cutting serrations in the opposite sides of the edge of a cutting tool comprising a pair of rolls arranged in contiguous parallel planes, shafts supporting the rolls for rotation about spaced parallel axes normal to said planes and with the periphery of each roll adjacent the axis of rotation of the other so that the peripheries of the rolls define a broad-mouthed notch, multiple right-hand threads on the periphery of one roll, multiple left-hand threads on the periphery of the other roll, the threads being interrupted by spaced cuts to constitute helical rows of teeth, means for rotating said shafts and their respective rolls in opposite directions to cause the peripheries of the rolls to turn toward one another at said notch, guide surfaces for directing the tool through said notch in a direction substantially parallel with the axes of rotation of the rolls, and means for urging the guided tool against the toothed peripheries of the rolls to be serrated thereby, the helical rows of teeth advancing the tool in said direction, the last-named means comprising a toothed rack, a rotatable shaft, a pinion secured on the shaft, a torsion spring exerting a turning force on the shaft to urge the rack toward the rolls, a part on the rack for engaging the tool, and a manual lever for turning the shaft.

3. A device for simultaneously cutting serrations in the opposite sides of the edge of a cutting tool comprising a pair of rolls of like diameter in contiguous parallel planes, means supporting the rolls for rotation about spaced parallel axes and in overlapping relation so that the periphery of each roll is tangent to a circle closer to the axis of rotation of the other roll than it is to the periphery of said other roll measured along a line extending between said axes, the peripheries of said overlapping rolls defining a notch, multiple threads on the peripheries of the rolls, the threads of the two rolls being of opposite hand, the threads being interrupted by spaced cuts to constitute helical rows of teeth, means for simultaneously rotating the rolls in opposite directions and so that their peripheries turn toward one another and toward the bottom of the notch, guide surfaces for directing the tool through the notch in a direction parallel with said axes, and means for urging the tool against the toothed peripheries of the rolls to be simultaneously serrated at the opposite sides of its edge by the teeth of the two rolls at the bottom of the notch, the rows of teeth advancing the tool in said direction, the last-named means including a slidable member, and a roller on the member for engaging the tool at a point substantially opposite the notch.

4. A device for simultaneously cutting serrations in the opposite sides of the edge of a cutting tool comprising a pair of rolls of like diameter in contiguous parallel planes, means supporting the rolls for rotation about spaced parallel axes and in overlapping relation so that the periphery of each roll is tangent to a circle closer to the axis of rotation of the other roll than it is to the periphery of said other roll measured along a line extending between said axes, the peripheries of said overlapping rolls defining a notch, multiple threads on the peripheries of the rolls, the threads of the two rolls being of opposite hand, the threads being interrupted by spaced cuts to constitute helical rows of teeth, means for simultaneously rotating the rolls in opposite directions and so that their peripheries turn toward one another and toward the bottom of the notch, guide surfaces for directing the tool through the notch in a direction parallel with said axes, and means for urging the tool against the toothed peripheries of the rolls to be simultaneously serrated at the opposite sides of its edge by the teeth of the two rolls at the bottom of the notch, the rows of teeth advancing the tool in said direction, the last-named means including a slidable member slidable toward said notch and tiltable about an axis transverse of the direction of said sliding movement, a part on the member for engaging the tool at a point substantially opposite said notch, and a mechanism for urging the member toward the bottom of said notch to press the tool against the toothed peripheries of the rolls.

5. A device for serrating the edge of a cutting tool comprising a pair of rolls of equal diameter, means supporting the rolls for rotation about spaced parallel axes to be in overlapping relation with the periphery of each roll closer to the axis of the other roll than to the periphery of the other roll measured along a line extending between said axes so that the peripheries of the rolls define a notch, multiple right hand threads on the periphery of one roll, multiple left hand threads on the periphery of the other roll, the threads being interrupted by spaced cuts to constitute helical rows of teeth, means for rotating the rolls simultaneously in opposite directions to cause their peripheries to turn toward one another and toward the bottom of the notch, guide surfaces for guiding the tool through said notch in a direction substantially parallel with the axes of rotation of the rolls, means for pressing the edge of the tool against the peripheries of both rolls at the bottom of the notch to be simultaneously serrated by the teeth of both rolls and to be advanced upwardly in said direction, and means above the rolls for receiving the end of the tool as it leaves the rolls to support the serrated tool.

6. A device for serrating the edge of a cutting tool comprising a pair of rolls of equal diameter, means supporting the rolls for rotation about spaced parallel axes to be in overlapping relation with the periphery of each roll closer to the axis of the other roll than to the periphery of the other roll measured along a line extending between said axes so that the peripheries of the rolls define a notch, multiple right-hand threads on the periphery of one roll, multiple left-hand threads of the periphery of the other roll, the threads being interrupted by spaced cuts to constitute helical rows of teeth, means for rotating the rolls simultaneously in opposite directions to cause their peripheries to turn toward one another and toward the bottom of the notch, guide surfaces for guiding the tool through said notch in a direction substantially parallel with the axes of rotation of the rolls, means for pressing the edge of the tool against the peripheries of both rolls at the bottom of the notch to be simultaneously serrated by the teeth of both rolls and to be advanced upwardly in said direction, and means above the rolls for receiving the end of the tool as it leaves the rolls to support the serrated tool, the last-named means including surfaces defining a recess for receiving said end of the tool, and an upwardly projecting support spaced from the recess to engage and support the tool at a distance from its said end.

7. A device for serrating the edge of a cutting tool comprising a pair of rolls of equal diameter, means supporting the rolls for rotation about spaced parallel axes to be in overlapping relation with the periphery of each roll closer to the axis of the other roll than to the periphery of the other roll measured along a line extending between said axes so that the peripheries of the rolls define a notch, multiple right hand threads on the periphery of one roll, multiple left hand threads on the periphery of the other roll, means for rotating the rolls simultaneously in opposite directions to cause their peripheries to turn toward one another and toward the bottom of the notch, guide surfaces for guiding the tool through the notch in a direction substantially parallel with the axes of rotation of the rolls, and means connected to said roll supporting means urging said cutting tool toward and at right angles to said line extending between said axes and in a plane bisecting said line so as to press the edge of the tool against the peripheries of both rolls at the bottom of the notch to be simultaneously serrated by the threads of both rolls.

8. A device for serrating the edge of a cutting tool comprising a pair of rolls of equal diameter, means supporting the rolls for rotation about spaced parallel axes to be in overlapping relation with the periphery of each roll closer to the axis of the other roll than to the periphery of the other roll measured along a line extending between said axes so that the peripheries of the rolls define a notch, multiple right hand threads on the periphery of one roll, multiple left hand threads on the periphery of the other roll, the threads being interrupted by spaced cuts to constitute helical rows of teeth, means for rotating the rolls simultaneously in opposite directions to cause their peripheries to turn toward one another and toward the bottom of the notch, guide surfaces for guiding the tool through the notch in a direction substantially parallel with the axes of rotation of the rolls, and means connected to said roll supporting means urging said cutting tool toward and at right angles to said line extending between said axes and in a plane bisecting said line so as to press the edge of the tool against the peripheries of both rolls at the bottom of the notch to be simultaneously serrated by the teeth of both rolls.

WHITMAN W. DAVIS.

References Cited in the file of this patent

UNITED STATES PATENTS

| Number | Name | Date |
|---|---|---|
| Re. 18,246 | Edgar | May 10, 1931 |
| 621,204 | Ballou | Mar. 14, 1899 |
| 1,435,514 | Burns | Nov. 14, 1922 |
| 1,469,985 | Bath | Oct. 9, 1923 |
| 1,925,108 | Nagy | Sept. 5, 1933 |
| 2,145,202 | Rickenmann | Jan. 24, 1939 |
| 2,197,119 | Barsch | Apr. 16, 1940 |
| 2,229,395 | Burns | Jan. 14, 1941 |
| 2,257,407 | Wulff | Sept. 30, 1941 |
| 2,354,509 | Dreher | July 25, 1944 |
| 2,432,534 | McBride | Dec. 16, 1947 |
| 2,444,110 | Pavesi et al. | June 29, 1948 |

FOREIGN PATENTS

| Number | Country | Date |
|---|---|---|
| 284,010 | Great Britain | Jan. 20, 1928 |
| 543,094 | Great Britain | Feb. 10, 1942 |